J. B. HOOD.
LOCKING NUT FOR BOLTS.
APPLICATION FILED DEC. 7, 1917.

1,324,822.

Patented Dec. 16, 1919.

INVENTOR:-
JAMES BRUCE HOOD.
PER:- Rayner & Co.
ATTORNEYS.

UNITED STATES PATENT OFFICE.

JAMES BRUCE HOOD, OF SHEFFIELD, ENGLAND.

LOCKING-NUT FOR BOLTS.

1,324,822.

Specification of Letters Patent.

Patented Dec. 16, 1919.

Application filed December 7, 1917. Serial No. 206,002.

*To all whom it may concern:*

Be it known that I, JAMES BRUCE HOOD, subject of the King of Great Britain and Ireland, residing at 38 Falmouth road, Abbeydale, Sheffield, in the county of Yorkshire, England, have invented certain new and useful Improvements in Locking-Nuts for Bolts, of which the following is a specification.

This invention relates to improvements in locking nuts for use in connection with bolts, studs, screwed spindles and the like, and has for its object the production of a nut which will automatically lock itself upon a screwed rod by means of one or more coiled springs attached to the nut.

In the accompanying drawings:—

Figure 1:
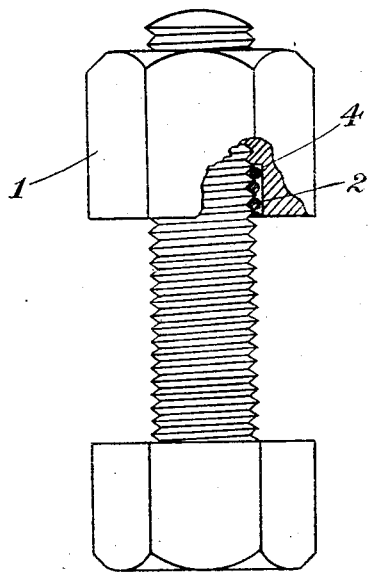
Figure 1 is the elevation of a bolt fitted with the improved locking nut.
Figure 2:
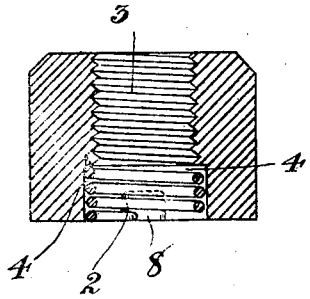
Fig. 2 is the vertical section of a nut provided with one locking spring.

According to this invention the nut 1, Figs. 1 and 2 is designed to carry one locking spring 2 and is preferably thicker than an ordinary nut for the same size of bolt. The upper part of the hole in the nut has a screw thread 3, and at the lower part of the nut there is a recess 4 the diameter of which is greater than the diameter of the bottom of the thread in the upper part of the nut, while the depth of the recess is varied in accordance with the number of coils in the spring 2.

The coils of this spring have approximately the same pitch as the screw thread in the nut and the upper end of the spring is rigidly attached to the upper part of the recess 4 and in such a manner that the coils of the spring form a continuation of the screw thread, and in all cases the free end of the spring is always inside the recess and above the lower end of the nut. The spring may be made from circular or other sectioned wire, which may fit the screw thread on the bolt, and the inner diameter of the spring or the pitch of the coils of the spring, or both these measurements, is or are so designed that there is an initial frictional grip of the spring upon the thread of the bolt screwed into it.

In the nut shown in Figs. 3 and 4 there is a recess 5 at both ends of the nut and each recess is fitted with a coiled spring 6 and such springs are constructed and arranged within the recess in exactly the same manner as the single spring hereinbefore described with reference to Figs. 1 and 2.

Figure 4:
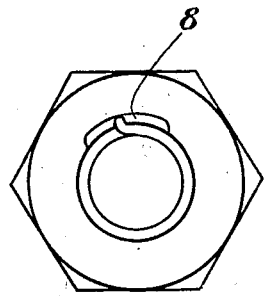
Fig. 4 is a plan of Fig. 3.

The free end of the spring may be bent and work within a recess 8 in the end of the nut as shown in Fig. 4.

Figure 3:
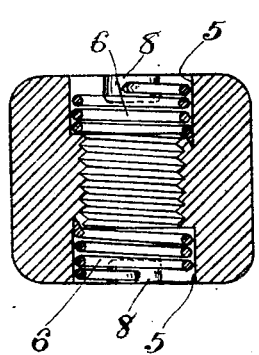
Fig. 3 is the vertical section of a nut provided with top and bottom locking springs.

The nut shown in Figs. 1 and 2 is designed for use with bolts and the like used for all kinds of fastenings and the nut shown in Figs. 3 and 4 is particularly suitable for use as a stop or regulating collar on screwed rods and for the purpose of preventing accidental movement of the nut in either direction.

What I claim as my invention and desire to obtain by Letters Patent is:—

The combination with a tapped nut having a recess at each end and a screw threaded portion between, of a coiled spring in each of said recesses attached to the inner parts thereof, said springs each forming a continuation of the screw thread and each having an internal diameter less than that of said screw thread.

JAMES BRUCE HOOD.